(12) United States Patent
Teauge et al.

(10) Patent No.: US 8,543,138 B2
(45) Date of Patent: Sep. 24, 2013

(54) MULTI-SECTOR BROADCAST PAGING CHANNEL

(75) Inventors: Edward Harrison Teauge, San Diego, CA (US); Avneesh Agrawal, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1938 days.

(21) Appl. No.: 11/175,788

(22) Filed: Jul. 5, 2005

(65) Prior Publication Data

US 2006/0199596 A1 Sep. 7, 2006

Related U.S. Application Data

(60) Provisional application No. 60/659,025, filed on Mar. 4, 2005.

(51) Int. Cl.
*H04W 68/00* (2009.01)
(52) U.S. Cl.
USPC .............................. 455/458; 455/466; 455/515
(58) Field of Classification Search
USPC ......................................... 455/458, 466, 515
See application file for complete search history.

(56) References Cited

U.S. PATENT DOCUMENTS

| | | | |
|---|---|---|---|
| 5,915,210 A | 6/1999 | Cameron et al. | |
| 6,038,450 A | 3/2000 | Brink et al. | |
| 6,075,994 A | 6/2000 | Bhat | |
| 6,141,555 A * | 10/2000 | Sato | 455/437 |
| 6,477,382 B1 * | 11/2002 | Mansfield et al. | 455/458 |
| 7,366,516 B1 * | 4/2008 | Oh et al. | 455/445 |
| 2001/0034233 A1 * | 10/2001 | Tiedemann et al. | 455/436 |
| 2002/0077087 A1 | 6/2002 | Li | |
| 2003/0081538 A1 | 5/2003 | Walton et al. | |
| 2003/0143999 A1 | 7/2003 | Funato et al. | |
| 2003/0145092 A1 | 7/2003 | Funato et al. | |
| 2003/0235181 A1 * | 12/2003 | Semper et al. | 370/350 |
| 2004/0192257 A1 | 9/2004 | Stenberg | |
| 2005/0041757 A1 * | 2/2005 | Rosen et al. | 375/295 |
| 2005/0175073 A1 * | 8/2005 | Pajukoski et al. | 375/146 |

(Continued)

FOREIGN PATENT DOCUMENTS

| | | |
|---|---|---|
| CN | 1158685 | 9/1997 |
| CN | 1308427 | 8/2001 |

(Continued)

OTHER PUBLICATIONS

International Search Report—PCT/US2006/008138, International Search Authority—European Patent Office—Sep. 6, 2006.

(Continued)

*Primary Examiner* — Wayne Cai
(74) *Attorney, Agent, or Firm* — Stanton Braden

(57) ABSTRACT

Systems and methods are described that facilitate improving paging signal strength at or near sector perimeters in a wireless network region by transmitted identical paging waveforms simultaneously from all sectors in the region and permitting over-the-air signal aggregation to combine signal energy near sector perimeters. Waveforms can be modulated using an orthogonal frequency division multiplexing technique and can be simultaneously transmitted according to predefined transmission resources over a multi-sector broadcast paging channel reserved for such identical waveforms. Cyclic prefix can be added to the identical waveforms to mitigate problems associated with delay spread and/or time-of-arrival differences at or near sector perimeters.

28 Claims, 11 Drawing Sheets

(56) References Cited

U.S. PATENT DOCUMENTS

| | | | | |
|---|---|---|---|---|
| 2005/0202813 A1* | 9/2005 | Saito | ............ | 455/432.2 |
| 2005/0277429 A1* | 12/2005 | Laroia et al. | .......... | 455/458 |
| 2006/0089141 A1* | 4/2006 | Ho et al. | ........ | 455/436 |

FOREIGN PATENT DOCUMENTS

| | | |
|---|---|---|
| EP | 0 544 462 | 4/1998 |
| EP | 1124348 | 8/2001 |
| EP | 1335503 A1 | 8/2003 |
| JP | 60500158 T | 1/1985 |
| JP | 2276322 A | 11/1990 |
| JP | 06070364 | 3/1994 |
| JP | 7111667 A | 4/1995 |
| JP | 08126051 | 5/1996 |
| JP | 10256962 | 9/1998 |
| JP | 2002514873 | 5/2002 |
| JP | 2004505492 | 2/2004 |
| JP | 2005006343 | 1/2005 |
| WO | WO9608117 | 3/1996 |
| WO | WO 02/09306 | 1/2002 |

OTHER PUBLICATIONS

Written Opinion—PCT/US2006/008138, International Search Authority—European Patent Office—Sep. 6, 2006.

International Preliminary Report on Patentability—PCT/US2006/008138, The International Bureau of WIPO, Geneva, Switzerland—Sep. 11, 2007.

3GPP: "3GPP TR 25.892 V6.0.0: Feasibility Study for Orthogonal Frequency Division Multiplexing (OFDM) for UTRAN enhancement (Release 6)", 20040601, [Online] vol. 25.892, No. V6.0.0, Jun. 1, 2004, pp. 1-21, XP002595526, Retrieved from the Internet: URL:http://ftp.3gpp.org/Specs/html-info/25 892.htm> [retrieved on Aug. 5, 2010].

European Search Report—EP10179013—Search Authority—Munich—May 27, 2011.

European Search Report—EP11162890—Search Authority—Munich—Jan. 18, 2012.

European Search Report—EP11162892—Search Authority—Munich—Jan. 18, 2012.

* cited by examiner

MULTI-SECTOR BROADCAST PAGING CHANNEL

CLAIM OF PRIORITY UNDER 35 U.S.C. §119

The present Application for Patent claims priority to Provisional Application No. 60/659,025 entitled "Multi-Sector Broadcast Paging Channel" filed Mar. 4, 2005, and assigned to the assignee hereof and hereby expressly incorporated by reference herein.

BACKGROUND

I. Field

The following description relates generally to wireless communications, and more particularly to providing a multi-sector broadcast paging channel.

II. Background

Orthogonal Frequency Division Modulation or Orthogonal Frequency Division Multiplexing (OFDM) is a protocol that is currently utilized in wireless environments to transmit and receive data. OFDM modulates digital information onto an analog carrier electromagnetic signal, and is utilized in an IEEE 802.11 a/g WLAN standard. An OFDM base band signal (e.g., a subband) is a sum of a number of orthogonal sub-carriers, where each sub-carrier is independently modulated by its own data. Benefits of OFDM over other conventional wireless communication protocols include ease of filtering noise, ability to vary upstream and downstream speeds (which can be accomplished by way of allocating more or fewer carriers for each purpose), ability to mitigate effects of frequency-selective fading, etc.

Paging channels are employed in wireless networks to page a subscriber station, such as a cellular phone, in order to instruct the subscriber station to connect to the network for service. In conventional systems, the network has only a rough knowledge of a location of a subscriber station, and no knowledge of channel quality in the area of the subscriber station prior to page transmission. Consequently, a page message typically sent over a wide region (e.g., a plurality of sectors) at low spectral efficiency due to such inadequate information. Thus, typical paging systems employ a paging channel that is transmitted independently from each sector in a paging region, which can be established based on a registration history for the subscriber station. A page can then be transmitted to the subscriber station by sending the paging message from each sector in the region. While such paging message can be transmitted at approximately the same time, page transmissions from different sectors are typically independent of each other.

Some conventional systems employ what is known as a forward link soft-handoff to improve performance. This technique permits multiple sectors to transmit a paging signal to a subscriber station when the network has an estimate of the location of the device. However, even though sectors can transmit similar signals, such signals are subject to sector-specific scrambling, which in turn requires that the subscriber station receive and decode the signals separately, and combine signal energy at the receiver after receipt and separate decoding. Such systems unnecessarily increase device complexity and signal translation overhead while reducing spectral efficiency.

In view of at least the above, there exists a need in the art for a system and/or methodology that facilitates improving paging signal spectral efficiency within a transmission region, and in particular near sector boundaries.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments include a plurality of systems/methodologies for improving spectral efficiency of paging transmissions by simultaneously transmitting substantially identical waveforms from multiple sectors in a paging region in a wireless networking environment (e.g., OFDM, OFDMA, . . . ). Such systems and/or methodologies can increase savings in overhead by mitigating paging channel consumption of air interface resources. According to this aspect, a time slot can be reserved for a paging channel across a region. Within a given time slot, an identical waveform can be transmitted across the region from a plurality of sector base stations. The waveform can comprise any and all pages targeted to the entire region. Upon receipt of a signal, a receiver in a subscriber station can demodulate the paging channel and energy from all sectors in the region can contribute to the total energy of the received signal, which can facilitate improving spectral efficiency.

According to a related aspect, subscriber stations at or near sector edges can be provided with improved signal strength by facilitating receipt of signal energy from multiple sectors. For example, all pages to be transmitted over a paging channel in a paging region can be encoded together prior to transmission, and can be simultaneously transmitted from all sectors (e.g., base stations) in the region. A modulation technique (e.g., OFDM, OFDMA, . . . ) can be employed to generate a waveform employed to transmit the pages. During modulation, a cyclic prefix can be introduced to the page signal to mitigate inter-symbol interference due to delay spread in a paging channel. Waveforms can be generated such that each waveform used to transmit a paging signal can be identical to all other paging waveforms, such that any slight time offsets in signal arrival at a receiver from different sectors can be identical to a channel delay spread. The cyclic prefix length for paging channel transmissions can be adjusted to remove the delay spread as well as any delay caused by time-of-arrival differences between transmissions from different sectors. In this manner, signal energy can be combined over the air without requiring special handling and/or processing at the receiver, thus improving spectral efficiency and simplifying receiver implementation.

In another aspect, a method of providing pages to subscriber stations over a wireless network using a multi-sector broadcast channel can comprise receiving data related to a list of all pages to be transmitted to subscriber stations in a paging region that has a plurality of sectors, generating an identical waveform at a base station in each of the plurality of sectors, and transmitting the identical waveform concurrently from all sectors in the region to page subscriber stations identified in the list of pages to be transmitted. The method can further include providing a cyclic prefix for one or more instances of the identical waveform to offset time-of-arrival delays and ensure that identical waveforms transmitted from different sectors can arrive at a common sector border and aggregate. A mobile communication device can then receive an aggregated paging signal at a higher spectral efficiency than conventional methods can provide at sector perimeters. Additionally, transmission resources can be defined, and transmission sectors comprised by the region can be dynamically reassigned between transmission resources to redefine the region based at least in part on page transmission volume and channel capacity. For example, a unique scrambling code can be employed by all sectors generating substantially identical waveforms, and the paging region can be redefined between resources by permitting only intended sectors to utilize the unique scrambling code. Sectors that do not employ the scrambling code are not included in the region for the given resource, although sectors can be added to the region by employing the unique scrambling code during a subsequent resource.

In yet another aspect, a system that facilitates simultaneously transmitting pages to all subscriber stations in a paging region of a wireless network can comprise a plurality of transmitters, each of which is located in one of a plurality of sectors of the paging region, and a waveform generation component associated with each transmitter, which receives information related to a list of all incoming pages for the paging region and generates a waveform comprising all pages for the region, wherein the waveform generation components in each sector generate identical waveforms. Moreover, the system can comprise an orthogonal frequency division multiplexing component that modulates the identical waveform.

In another aspect, a system that facilitates providing a multi-sector broadcast channel for transmission of pages in a wireless network region can comprise a base station controller that receives a list of pages to be transmitted to access terminals in the wireless network region and generates and transmits an instruction related to the list of pages, and a waveform generation component that receives the instruction and generates a waveform comprising all pages to be transmitted to access terminals in the region. Additionally, each base station in the region can comprise a respective waveform generation component that receives the instruction from the base station controller, and each waveform generation component can generate a substantially identical waveform comprising all pages to be transmitted, in response to the instruction. Transmission of the substantially identical waveforms can be synchronized to facilitate over-the-air waveform aggregation, mitigating a need for separate waveform decoding by a receiving device or access terminal.

According to still another aspect, an apparatus that facilitates paging all intended subscriber stations in a wireless network region using simultaneous multi-sector broadcast transmissions can comprise means for receiving a complete list of pages to be transmitted to subscriber stations in a region, means for generating an identical waveform at each of a plurality of transmission base stations in respective sectors of the region, the identical waveform comprising all pages to be transmitted in the region, and means for transmitting the identical waveform simultaneously from all base stations in the region, wherein signal energy of at least two identical waveforms is aggregated near sector perimeters. In this manner, the apparatus can facilitate improving spectral efficiency near sector perimeters where conventional systems and methods provide only diminished signals.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
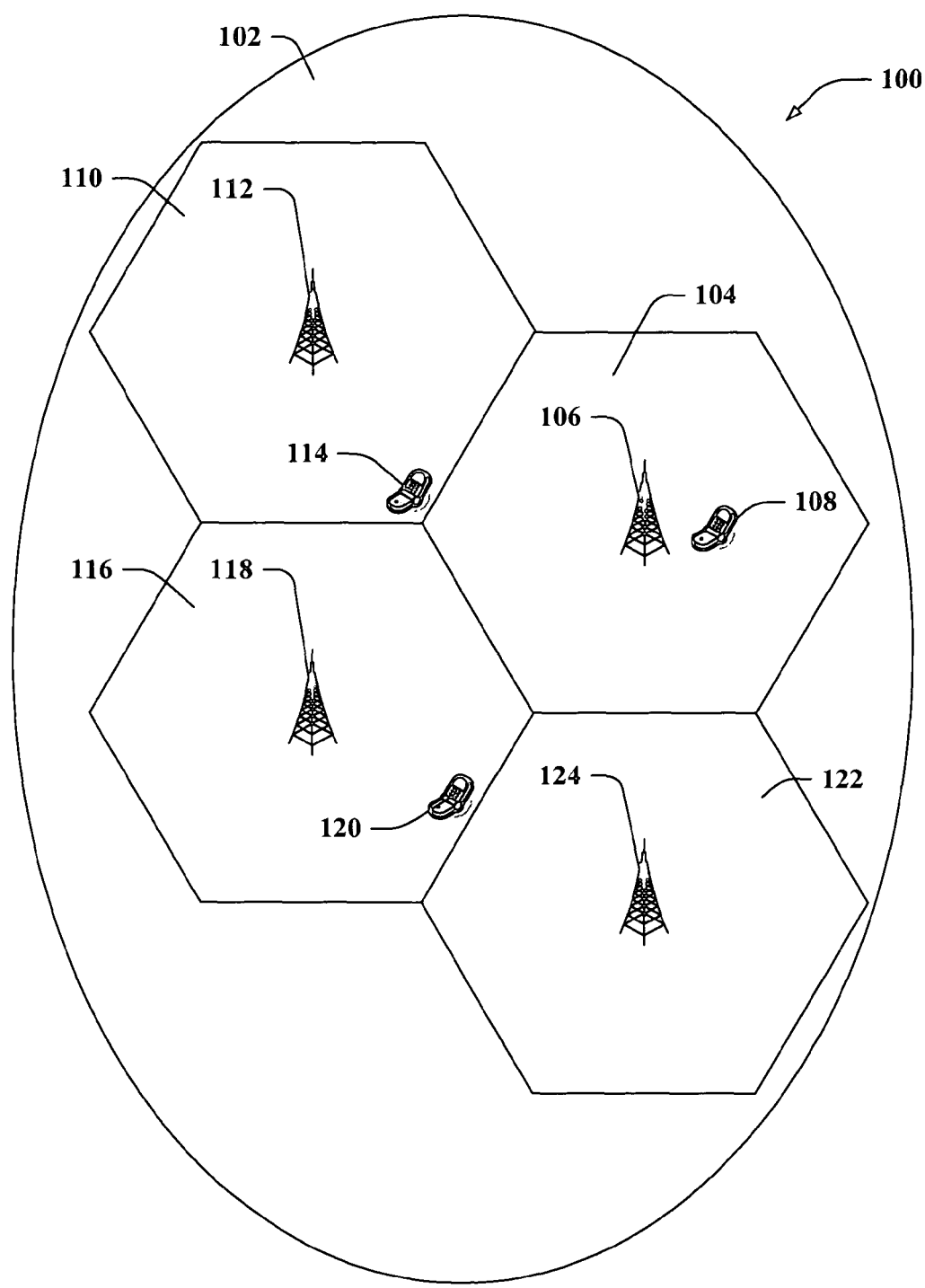
FIG. 1 illustrates a high-level system overview of a mobile network in accordance with various embodiments.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers.

Additionally, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also, for example, be a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, an access terminal or other processing device connected to a wireless modem. A base station may, for example, be a fixed station used for communicating with the terminals and may also be referred to as, and include some or all the functionality of, an access point, a Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ) and integrated circuits such as read only memories, programmable read only memories, and electrically erasable programmable read only memories.

Referring now to the drawings, FIG. 1 illustrates a high-level system overview of a mobile network in connection with various embodiments. The embodiment relates to a novel system 100 that facilitates improving spectral efficiency at or near sector boundaries in a wireless network service region. A region 102 can be any service area and can comprise any number of sub-regions, or sectors, each of which can further comprise at least one base station (e.g., tower, transmitter, . . . ) from which a communication signal can be transmitted to provide service to the sector. For example, a sector 104 can comprise a base station 106 that can transmit a signal to a subscriber station 108 in sector 104.

Subscriber stations 108, 114, 120, such as cellular telephones, typically register with the network periodically and/or in response to certain registration-triggering events to inform the network of the location of subscriber stations 108, 114, 120. For instance, distance-based registration methods predefine a distance or radius for a subscriber station 108, such that if subscriber station 108 moves more than the predefined distance from geographic coordinates of a last registration, then the subscriber station 108 re-registers with the network to alert the network to its position. Alternatively, area-based registration can be employed to trigger device registration. For instance, movement of subscriber station 108 across a sector boundary (e.g., from sector 104 to sector 110) can trigger subscriber station 108 to transmit a signal to the network indicating that device 108 is currently in the new sector 110, and that therefore the network should attempt to page device 108 in the new sector 110.

The subject embodiment facilitates transmitting a page to a subscriber station 108 without requiring that the sector within the region in which subscriber station 108 is located be known. Rather, if subscriber station 108 is known to be in service region 102, then a single, identical paging message can be transmitted from all base stations to present a paging signal to all points in region 102. For example, a single waveform can be generated and transmitted from base stations 106, 112, 118, 124 in each of sectors 104, 110, 116, 122 to all subscriber stations 108, 114, 120. Thus, a common waveform is provided by each of base stations 106, 112, 118, 124 in service region 102 to subscriber station 108 in sector 104, for illustration. Due to the location of subscriber station 108 in sector 104, the signal received by subscriber station 108 can predominantly, if not entirely, be obtained from base station 106 in sector 104; however, all of the base stations 106, 112, 118, 124 within service region 102 can transmit the same waveform.

Subscriber station in sector 116, for instance, is located near the border of sector 122, and therefore can receive a signal that is an aggregate of the signal broadcast from station 118 in sector 116 as well as station 124 in sector 122. Such signal aggregation can occur within the air interface and need not require special functionality at a receiver because the waveform transmitted from base stations 118 and 124 in sectors 116 and 122 are identical. Similarly, subscriber station 114 in sector 110 can receive signals from base stations in sectors 104, 110, 116, and 122, rather than from sector 110 only. In this manner, the described embodiment facilitates enabling high spectral efficiency near sector borders, where conventional systems that provide differing waveforms from each base station fail.

According to related aspects, the waveform transmitted from base stations 106, 112, 118, 124 can be modulated according to, for example, OFDM protocol or the like. Additionally, cyclic prefixes can be appended to the paging signals to adjust for time delays that can arise due to variances in the respective distances of base stations 106, 112, 118, 124 from a given subscriber station. In this manner, signals from different sectors 104, 110, 116, 122 and/or base stations 106, 112, 118, 124 therein can be manipulated to facilitate ensuring their arrival at a given subscriber station within a predefined guard time (e.g., a time period within which interference is minimal). Thus, a receiving device need not be aware of the signal source(s), but rather can be concerned with demodulating the aggregate of the transmitted identical paging signals.

A unique scrambling code can be employed in sectors 104, 110, 116, 122 such that substantially identical waveforms transmitted therein have identical scrambling codes. Neighboring regions can employ orthogonal or pseudo-orthogonal (e.g., random) scrambling codes. If desired, a paging region can be redefined by altering the sectors that are permitted to employ the unique scrambling code. For instance, sectors 104, 110, and 116 can employ the unique scrambling code on a subsequent paging cycle, while sector 122 is excluded from the paging region and employs an orthogonal scrambling code, etc. Furthermore, system 100 can be employed in connection with any number of suitable devices with wireless communications capabilities.

Figure 2:
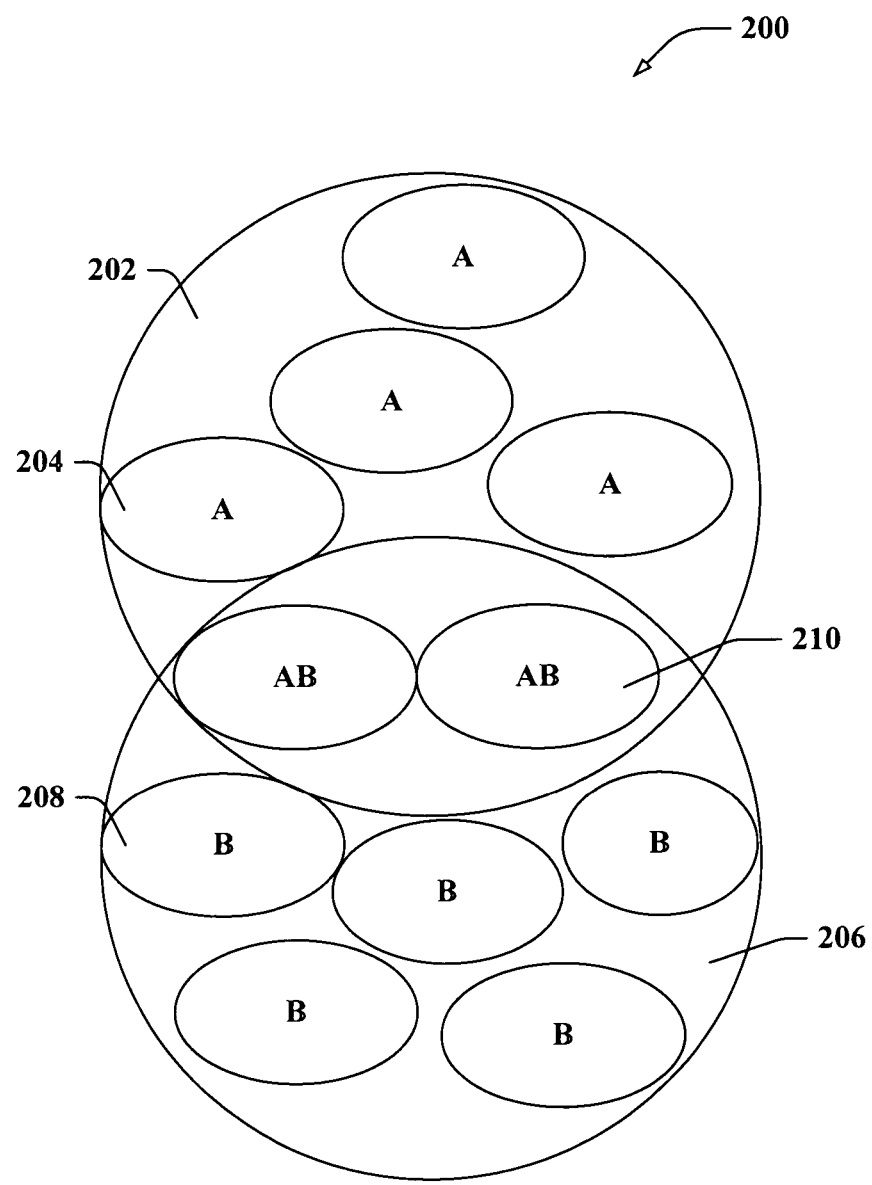
FIG. 2 is an illustration of wireless network sectors within a region, wherein signals transmitted from within each sector can overlap in accordance with various embodiments.

FIG. 2 is an illustration of wireless network sectors within a region 200, wherein signals transmitted from within each sector can overlap. For example, a first sector 202 can transmit Signal A throughout its broadcast radius, and one or more subscriber stations located in areas 204 in the area can receive signal A. A second sector 206 can transmit signal B throughout its broadcast range, which can be received by subscriber stations in areas 208 within the broadcast range. Under conventional system constraints whereby sectors transmit unique individual paging signals, subscriber stations in areas 204 registered in first sector 202 would only receive signal A, regardless of whether they are within the broadcast radius of signal B. Likewise, subscriber stations in areas 208 registered in second sector 206 would only receive signal B. Moreover, signals A and B can interfere with each other, further reducing signal strength and/or quality near the edges of the respective sectors 202 and 206. However, in accordance with the subject embodiment, signals A and B can be generated such that they are identical, which permits a subscriber station in area 210 located within the broadcast radius of both sectors 202 and 206 to receive an aggregated signal, rather than a diminished signal. For instance, because signals A and B are identical, their convergence at the location of a subscriber station in area 210 can result in increased signal energy that can be received and demodulated by a subscriber station in area 210. Additionally, a subscriber station in area 210 need not discern a source of the signal(s) because the signals are identical and aggregated over the air.

Figure 3:
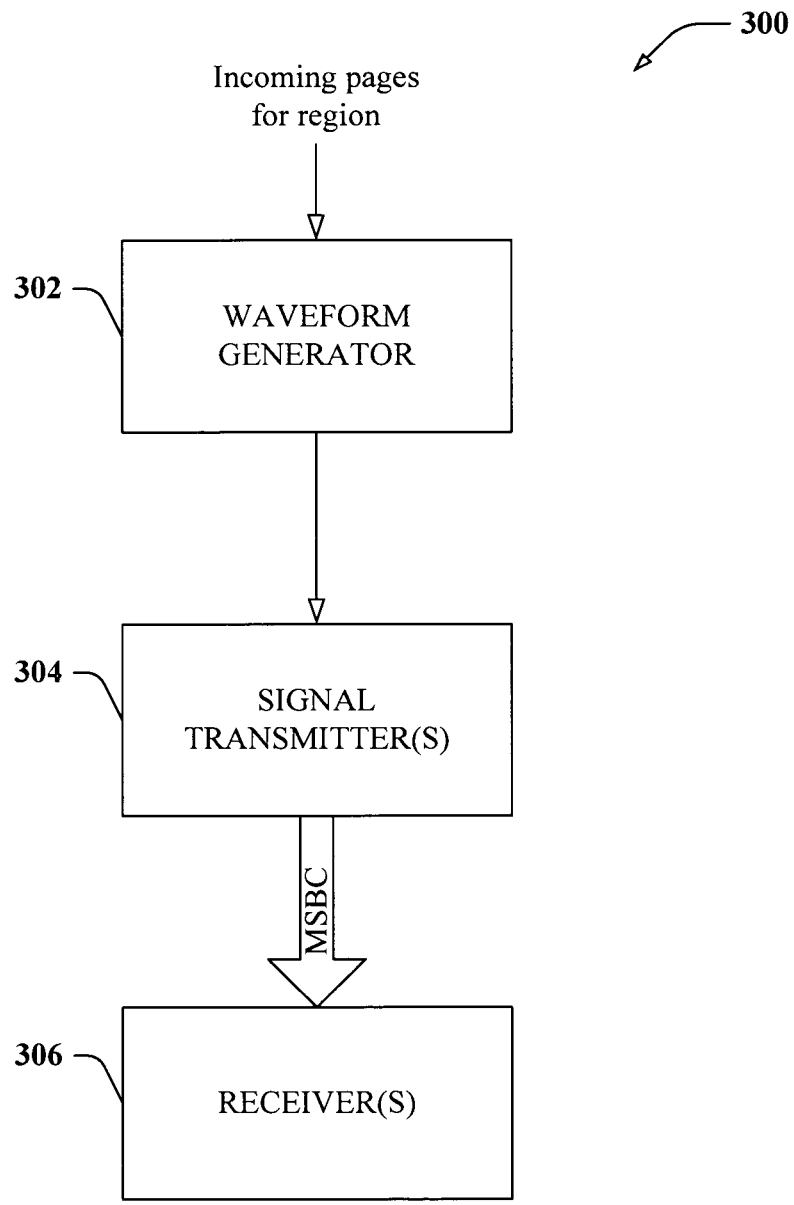
FIG. 3 illustrates a system that facilitates providing a multi-sector broadcast paging channel in accordance with various embodiments.

FIG. 3 illustrates a system 300 that facilitates providing a multi-sector broadcast paging channel in accordance with various embodiments. System 300 comprises a waveform generator 302 that can generate a waveform containing information related to all pages to be transmitted over an entire region. For example, all pages to subscriber stations in the region can be encoded and packaged for transmission. The waveform generated for transmission can then be transmitted simultaneously from all sectors in the region by way of signal transmitters 304 in each sector of the region. A plurality of receivers (e.g., subscriber stations, laptops, cellular phones, PDAs, . . . ) can receive the signal and/or an aggregate of the signal transmitted from the signal transmitters at any point in the region, including points at or near sector borders within the region, in order to improve spectral efficiency.

Spectral efficiency may be used to represent wireless system capacity (e.g., an ability to deliver maximum information in limited spectrum bandwidth). Typically, spectral efficiency is a quotient of channel volume and channel bandwidth, measured in bits/second/Hertz/sector. As spectral efficiency is increased, bandwidth can be reduced, as can a number of transmitting base stations required to achieve design goals associated with a wireless system, which in turn can reduce operating costs and/or capital required when expanding a service area. Thus, system 300 can facilitate improving spectral efficiency in a wireless network by generating a single, identical waveform for transmission from all base stations in a service region.

In a typical wireless system, sectors transmit independently, which can result in a subscriber station at a sector edge experiencing poor signal quality. Since page transmissions are typically broadcast and intended to be decodable by all users in a region, it is desirable to ensure that such page transmissions are provided at a spectral efficiency that permits receipt, recognition, and/or decoding at sector edges despite increased geographical distance from a sector base station. Subscriber stations, when located at or near sector edges, are likely to receive multiple signals from multiple sectors. Thus, by improving signal quality at sector edges, a paging channel can operate with greater spectral efficiency than could otherwise be achieved without combining energy from multiple sectors in the paging region. By generating a substantially identical waveform for transmission from all sectors, waveform generator 302 ensures that receivers 306 located near sector edges can receive a paging signal from sector transmitter 304 located in their sector as well as from one or more peripheral sector transmitters 304. Moreover, because the signal energy is combined over the air, no special processing is utilized at receiver 306 (e.g., the receiver need not demodulate a different signal from each sector prior to combining signal energy of the processed signals to detect the signal). In this manner, paging signal reception can be improved near sector borders without increasing network overhead and/or elements.

According to an example, all sectors in a region can employ identical scrambling codes when generating substantially identical waveforms. Neighboring paging regions and/or sectors therein can employ orthogonal or pseudo-orthogonal (e.g., random) scrambling codes that can be differentiated from the unique scrambling code(s) employed by the sectors of the subject paging region. The paging region can be altered and/or dynamically redefined based on which sectors employ the unique identical scrambling codes during a given resource.

Figure 4:
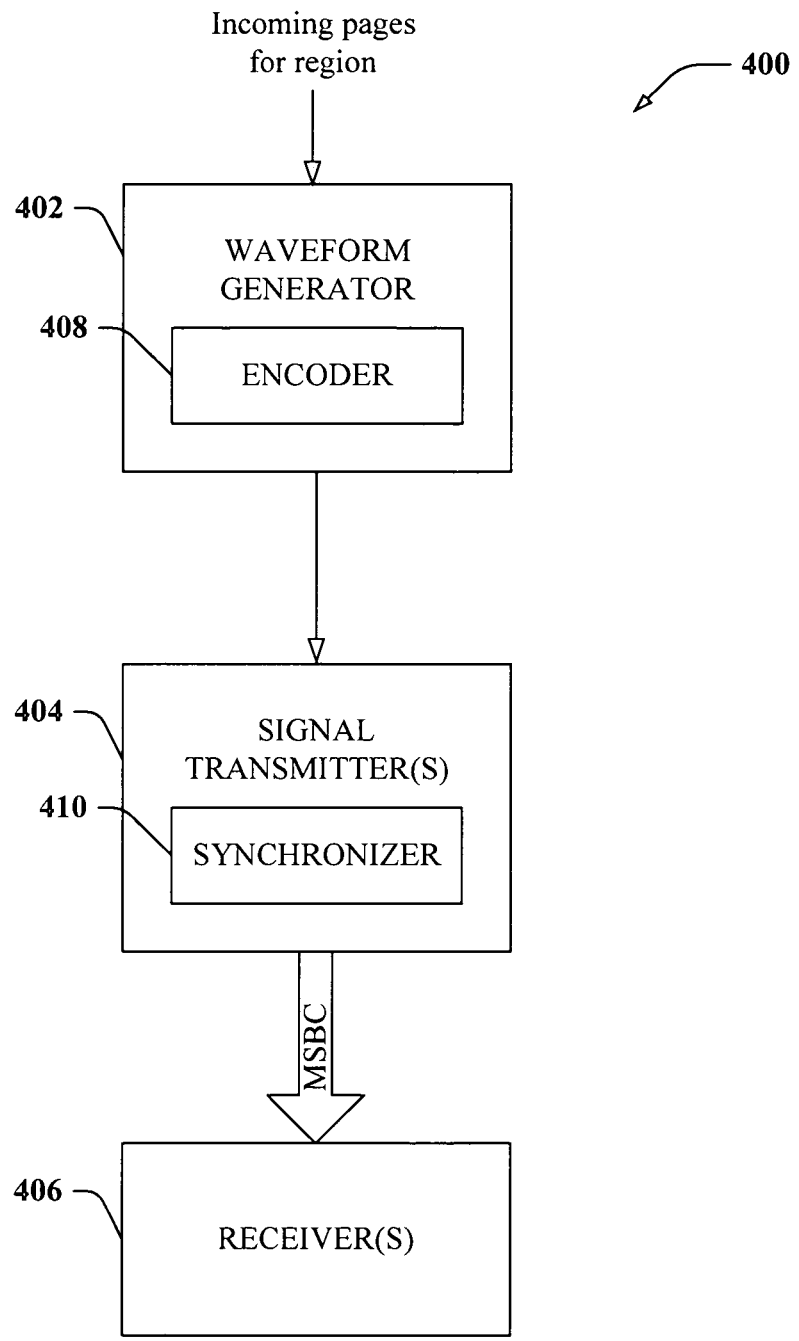
FIG. 4 illustrates a system that facilitates providing a multi-sector broadcast paging channel in accordance with various embodiments.

FIG. 4 illustrates a system 400 that facilitates providing a multi-sector broadcast paging channel in accordance with an aspect. The system comprises a waveform generator 402 that is operatively associated with one or more signal transmitters 404 that broadcasts a paging signal to a receiver 406, as detailed supra with regard to FIG. 3. Transmitter 404 can be, for instance, a base station in a sector of a wireless network service region. Receiver 406 can reside in, for example, a mobile phone, a laptop, a PDA, etc.

Waveform generator 402 comprises an encoder that facilitates encoding a plurality of pages to be transmitted over the paging channel in the paging region. The pages can be encoded together as a paging "packet" for simultaneous transmission from all sectors in the paging region. Encoding all pages to be transmitted over a region in a single paging packet permits a single paging waveform to be created by waveform generator 402, which can be simultaneously broadcast from every sector in the paging region by a signal transmitter 404 in each sector. Because an identical signal is broadcast from each sector, receivers 406 near sector borders can receive an aggregate of signals from proximate sectors. Additionally, because the waveform of each signal is the same, such signals can be aggregated in the air, which mitigates a need for special treatment of individual signals by receiver 406 prior to combining signal energy.

In order to facilitate signal transmission in a manner that permits signal aggregation over the air, signal transmitters 404 can comprise a synchronizer component 410 that ensures that the identical waveform is transmitted from all sectors in the region simultaneously to ensure that the signals can be aggregated over the air. One or more resources can be assigned to the regional paging signal and/or the multi-sector broadcast channel, during which the identical waveform can be transmitted from all transmitters 404 in the region. Synchronizer component 410 can comprise an internal clock (not shown) that can be synchronized to all other transmitters in a region in order to ensure that the paging signal is transmitted there from simultaneously. Such a clock can be, for instance, a GPS clock and the like. Time delay that can arise as a product of respective distances of signal transmitters 404 from a particular receiver 406 can be mitigated as well, as will be discussed in further detail with regard to FIG. 6.

Figure 5:
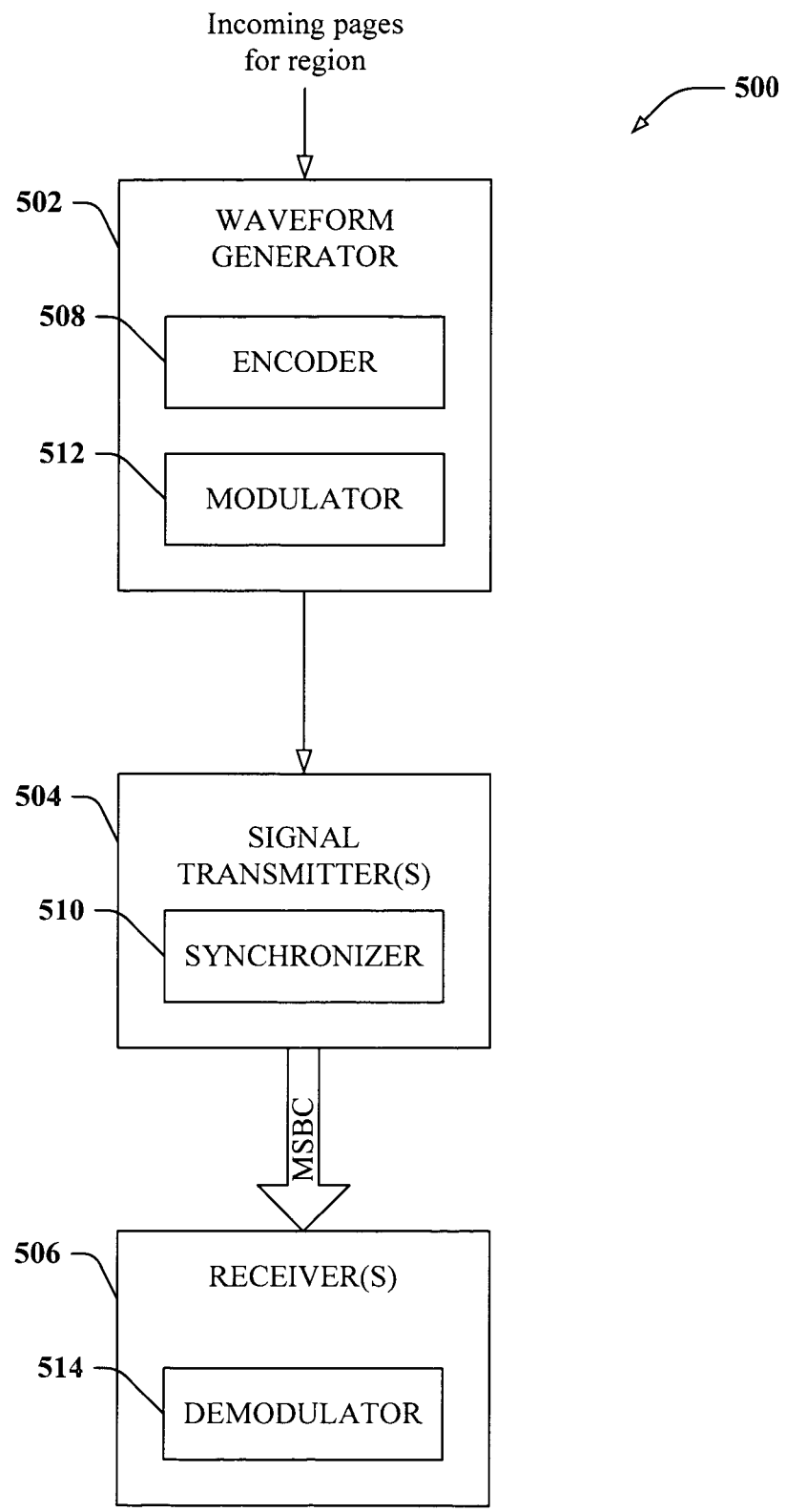
FIG. 5 is an illustration of a system that facilitates providing an MSBC paging channel for synchronously transmitting a regional paging signal in accordance with various embodiments.

FIG. 5 is an illustration of a system 500 that facilitates providing an MSBC paging channel for synchronously transmitting a regional paging signal. System 500 comprises a waveform generator 502 that is operatively coupled to one or more signal transmitters 504 (e.g., sector base stations, . . . ) that transmit signals to one or more receivers 506. Waveform generator 502 receives information related to pages to be broadcast in the region, and comprises an encoder 508 that encodes all pages to be transmitted within a given region as a single data packet, which can be employed during waveform generation to create a single waveform that can be broadcast from all transmitters 504 in the region. Signal transmitter(s) 504 comprises a synchronizer component 510, such as a GPS clock, that can facilitate synchronously transmitting identical waveforms (or substantially identical waveforms, . . . ) from transmitters 504 during a transmission resource assigned to the MSBC paging channel. Waveform generator 502 additionally comprises a modulator 512 that can be employed during waveform generation for regional transmission.

Modulator 512 can be, for instance, an orthogonal frequency division multiplexing (OFDM) component that can divide a data stream into multiple radio frequency channels that can be sent over respective sub-carrier frequencies. Encoder 508 can encode data symbols related to all pages to be transmitted over a given region and modulator 512 can assign the encoded paging symbols to a unique frequency (e.g., a defined channel) orthogonal to other frequencies being transmitted throughout the region. In the case of an OFDM modulator, guard bands can be employed at edges of the channel frequency to improve spectral efficiency. OFDM is based on the concept the Fast Fourier Transform, which can facilitate maintaining the MSBC channel in an orthogonal state relative to other channels being transmitted. It is to be appreciated that the modulator can employ other modulation techniques, such as OFDMA, CDMA, TDMA, GSM, etc., as will be appreciated by one skilled in the art.

Once the MSBC channel has been defined and assigned to the encoded paging signal and an identical waveform has been generated at each sector transmitter in the region, all transmitters 504 in the region can simultaneously transmit identical waveforms to provide an aggregate signal throughout the region that can be received by one or more receivers 506 in one or more subscriber stations. Upon receipt of the aggregate paging signal over the MSBC paging channel, a demodulator 514 operatively associated with the receiver can demodulate the signal for analysis and/or interpretation. Demodulator 514 need not process individual signals from disparate transmitters because signals transmitted there from can combine in the air where they overlap, providing an aggregate, improved signal to receiver 506. In this manner, system 500 can improve signal quality at, for instance, sector boundaries, where conventional sector-specific page signals are diminished.

Figure 6:
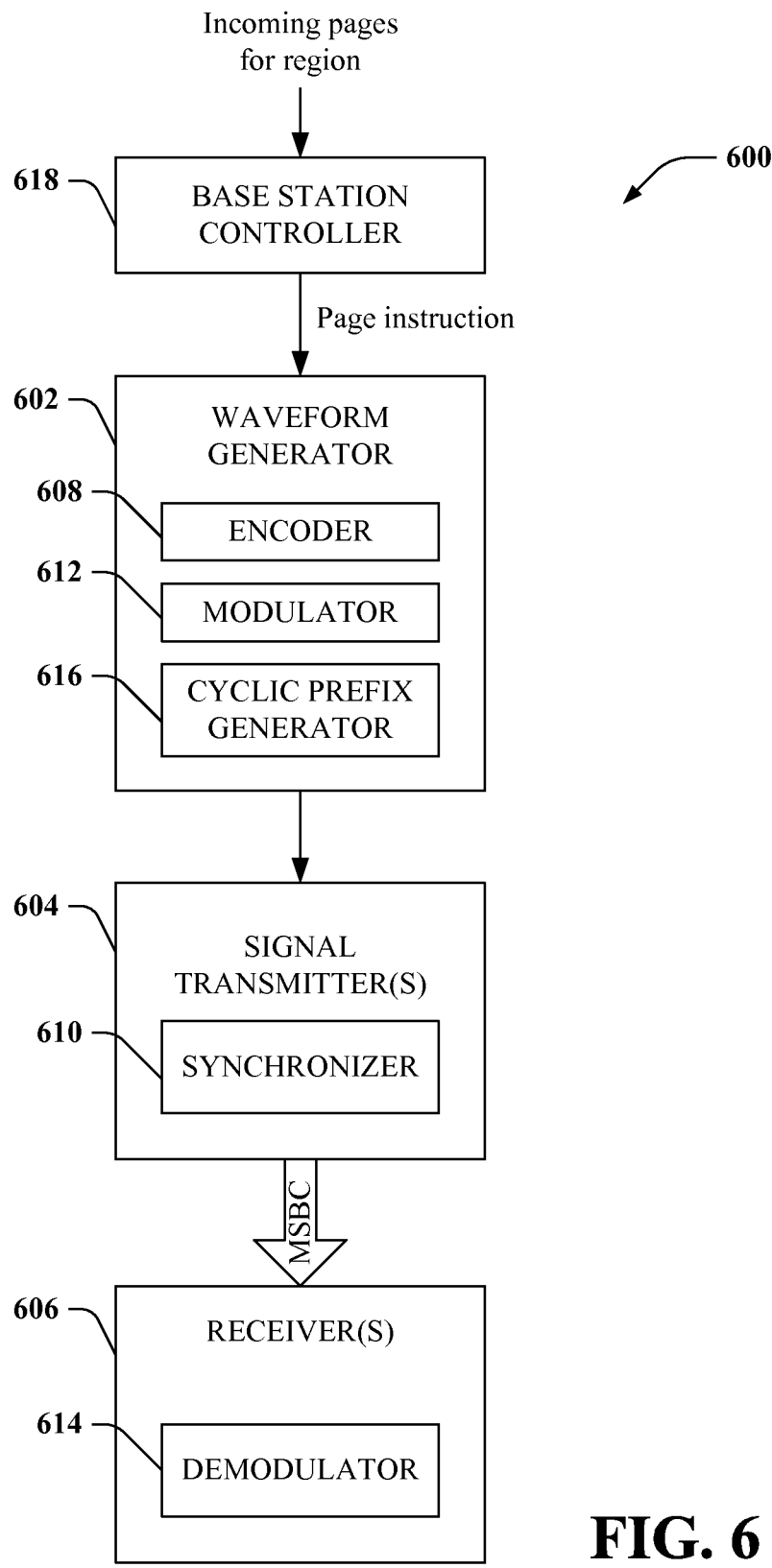
FIG. 6 is an illustration of a system that facilitates providing a region-wide paging signal to subscriber stations within a region in accordance with various embodiments.

FIG. 6 is an illustration of a system 600 that facilitates providing a region-wide paging signal to subscriber stations within a region. System 600 comprises a waveform generator 602 that receives information and/or an instruction related to pages to be transmitted over the entire region, which is operatively coupled to a signal transmitter 604 that transmits an encoded, modulated waveform to a receiver 606 during a predefined resource in which the waveform is slated for transmission. Waveform generator 602 comprises an encoder that encodes information related to pages in a region as a single packet of data, and a modulator 612, such as a multiplexer (e.g., OFDM, OFDMA, . . . ), that generates the waveform comprising the encoded paging information for transmission over a pre-assigned MSBC paging channel. Transmitter 604 comprises a synchronizer component 610 that can trigger transmission of the waveform simultaneously with transmission of identical waveforms from other transmitters in other sectors of the region. Receiver 606 comprises a demodulator 614 that can process the waveform received over the MSBC paging channel.

Waveform generator 602 additionally comprises a cyclic prefix generator 616 that facilitates accounting for time delay that can arise as a result of signals being transmitted from transmitters 604 at different distances from a particular receiver 606. Cyclic prefix generator 616 can insert a cyclic prefix into the waveform during OFDM modulation as a countermeasure to offset any deleterious effect of delay spread, such as inter-symbol interference. Inter-symbol interference can arise because a channel performs a linear convolution of its own impulse response within the time domain waveform (e.g., after application of an inverse fast Fourier transform and concatenation of a data block). The linear convolution of a signal with its impulse response can overlap portions of two adjacent symbols, causing one symbol to bleed into its neighbor. Because waveforms transmitted simultaneously from a plurality of signal transmitters 604 (e.g., base stations) in a region are identical, slight time offsets in signal arrival at receiver(s) 606 from different sectors can be identical to delay spread associated with such signals. Cyclic prefix length for paging channel transmissions can be adjusted to remove both delay spread from individual channels as well as any delays associated with different time-of-arrivals of transmissions from transmitters in different sectors of the region.

It will be appreciated that system 600 (as well as systems 300, 400, and/or 500) can comprise a base station controller 618, such as a region server, that can receive a list of all access terminals and/or subscriber stations to be paged in a given cycle, and can generate an instruction related to the list of pages to be transmitted. The instruction can then be transmitted to a waveform generator 602 in each of a plurality of base stations in the region. Waveform generator(s) 602 can then proceed to generate and store identical waveforms comprising pages to be transmitted, as detailed with regard to this and the preceding figures. Such transmission can be synchronized to facilitate waveform aggregation over the air, which in turn can mitigate a need for individual waveform decoding prior to signal energy combination in a receiving device. Base station controller 618 can be housed in one of a plurality of base stations in the region.

According to other aspects, the paging channel waveform can be different from a waveform utilized to transmit other channels. For instance, the paging channel can be OFDM-modulated despite the use of a CDM waveform for other transmission channels. Additionally and/or alternatively, when all channels are transmitted using OFDM modulation, the paging channel can have a larger cyclic prefix duration than other channel transmissions in order to account for different delays from different sectors.

Referring to FIGS. 7-10, methodologies relating to generating coarse estimates of wireless symbol boundaries in time domain are illustrated. For example, methodologies can relate to waveform generation and aggregation in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
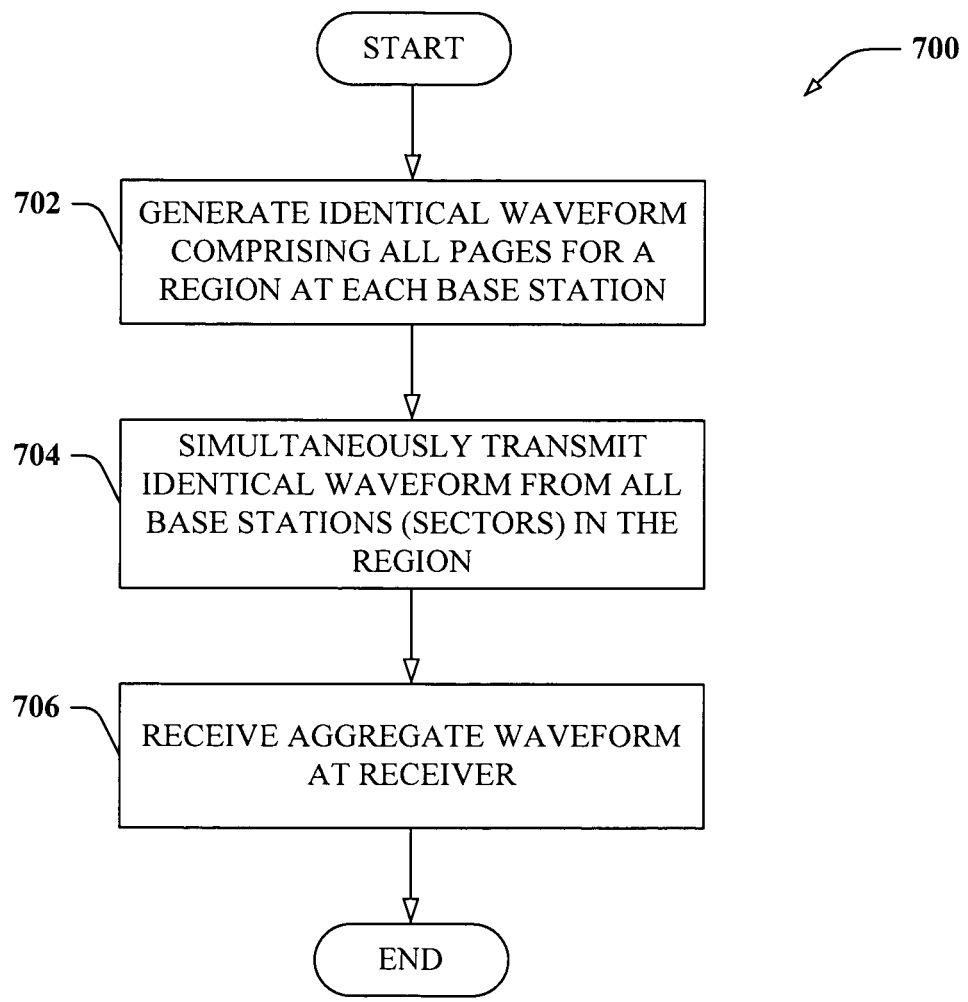
FIG. 7 is a flow diagram illustrating a methodology for providing a region-wide synchronized paging signal that is transmitted simultaneously from base stations in each sector of a wireless network region in accordance with various embodiments.

Referring now to FIG. 7, a methodology 700 for providing a region-wide synchronized paging signal that is transmitted simultaneously from base stations in each sector of a wireless network region is illustrated. At 702, an identical waveform comprising information related to all incoming pages for the region can be generated at each base station (e.g., in each sector). By generating identical waveforms, sector-specific information related to receiver (e.g., subscriber station, cell phone, laptop, . . . ) can be disregarded because the waveform comprises information related to all pages in the entire region. At 704, all base stations in the region can concurrently transmit identical waveforms, which permits over-the-air signal aggregation. The transmission of the identical waveforms from all sectors in the region can facilitate improving signal strength in areas where conventional wireless network systems/methodologies exhibit diminished signal quality, such as at sector boundaries. Because conventional systems typically transmit sector-specific waveforms from each base station, the waveform is diminished as it travels outward from the transmitter. A cell phone near the sector border will not receive as strong a signal as a cell phone closer to the base station in such conventional network areas. Thus, by simultaneously transmitting the same signal from all sectors, a signal transmitted from a first base station can be augmented by its identical counterpart transmitted from a base station in a neighboring sector in the region. Such signals will generally meet in airspace approximately equidistant from the base stations (e.g., near sector perimeters), where they can self-combine to permit a stronger signal to be received by a receiver near the sector perimeter at 706. In this manner, the method 700 can facilitate providing improved signal strength throughout a region without being limited to transmitting a page to a receiver solely from a base station in the sector in which the receiver is registered.

Figure 8:
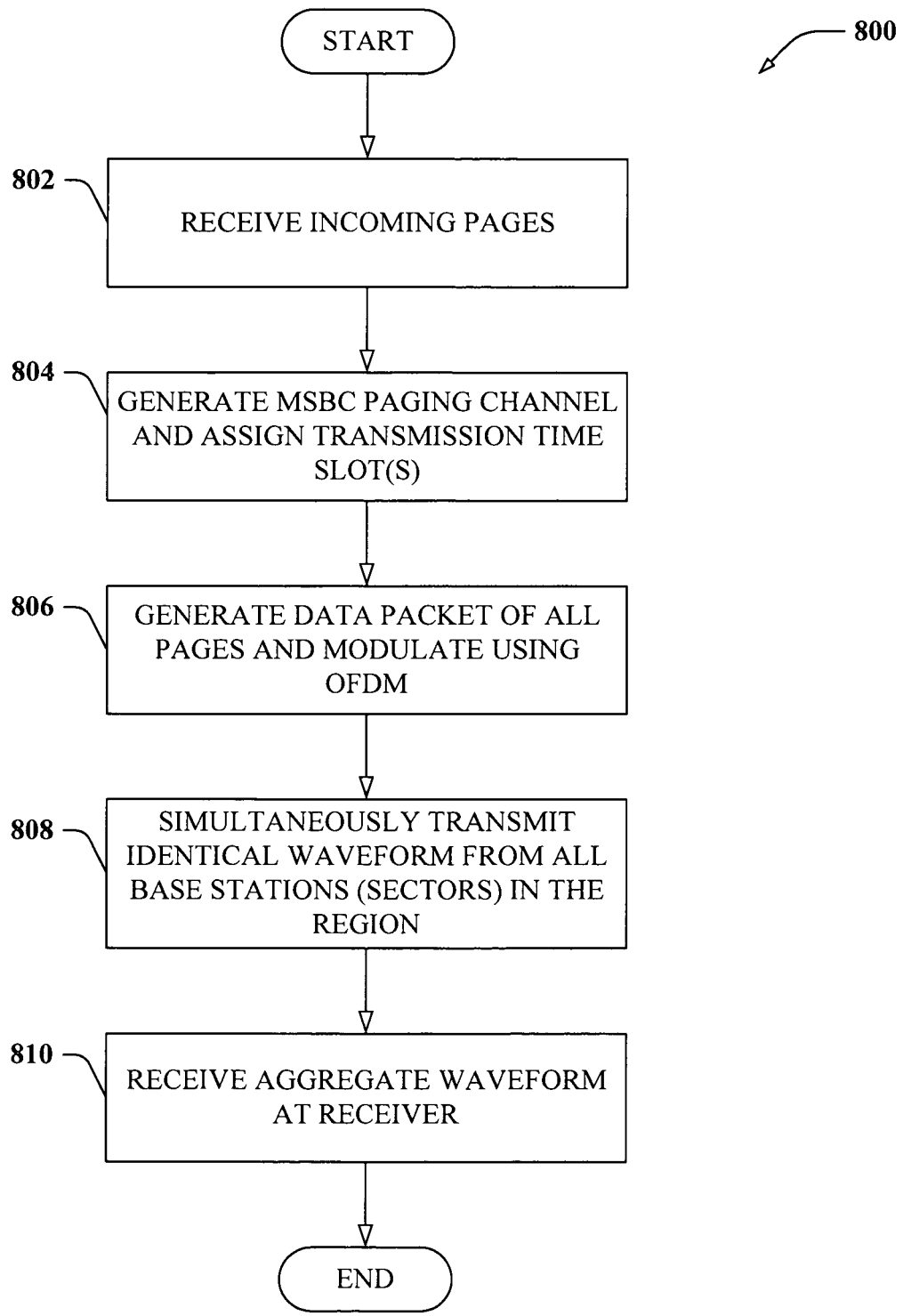
FIG. 8 illustrates a methodology for improving signal strength near sector perimeters in a wireless network region and implementing an MSBC paging channel in accordance with various embodiments.

FIG. 8 illustrates a methodology 800 for improving signal strength near sector perimeters in a wireless network region and implementing an MSBC paging channel. At 802, incoming paging messages for the entire region can be identified, assessed, and the like. Page messages need not be routed to specific sectors in which an intended recipient has been registered. At 804, transmission resources can be assigned to a paging channel, e.g. the MSBC. It will be appreciated that the resources can be predefined and/or generated prior to page message assessment if desired. At 806, a data packet comprising all page messages for the entire region can be encoded, and the data packet can be modulated using a multiplexing technique, such as OFDM modulation and the like. The method 800 is not limited to OFDM, but can utilize other modulation techniques such as OFDMA, COFDM, CDMA, TDMA, and the like, as will be appreciated by one skilled in the art. In the case of OFDM modulation, an inverse fast Fourier transform can be performed on the data packet and/or symbols therein to facilitate modulating the signal. Waveform generation can be performed at a base station in each sector of the region, and, at 808, all base stations in the region can synchronously transmit identical signals over the MSBC paging channel (e.g., waveforms) during a resource assigned to the paging channel at 804.

Simultaneously transmitting the signal, upon an occurrence and/or recognition of an assigned resource trigger, permits the region to be permeated with a single paging signal that originates from a plurality of disparate sources. Each instance of the signal can travel outward from its respective base station in each sector toward a sector perimeter. When signals transmitted from different sectors meet, they can aggregate signal strength by self-combining because they are identical. In this manner, signal strength near a base station can be largely a product of the signal from the particular base station itself, while signal strength at or near sector perimeters can be a product of the sector base station transmission as well as transmissions from neighboring base stations. A receiver in, for instance, a cellular telephone can receive the aggregate signal at 810.

According to an example, if a first signal is diminished by 60% at the perimeter of its sector of origin, it will have a signal strength of only 40% of original strength. A neighboring sector base station that simultaneously transmits an identical second signal might exhibit 38% signal strength at a shared perimeter area between the sectors. Conventional systems/methodologies dictate that a subscriber station registered in the first sector and located near the sector border can only receive the first signal at 40% of original strength. However, the signals transmitted according to the subject embodiment are identical, and so can aggregate over the air to provide a signal at 78% of original signal strength to a subscriber station near the sector perimeter, regardless of the sector in which the subscriber station is located and/or registered. It is to be appreciated that the foregoing signal strength percentages are illustrative in nature only, and are not intended to specifically limit or define signal strength percentages achieved at sector borders. Moreover, signal aggregation is not limited to signal aggregates of only two sectors, but rather any number of sector transmissions can be combined to increase signal strength where such signals overlap.

Figure 9:
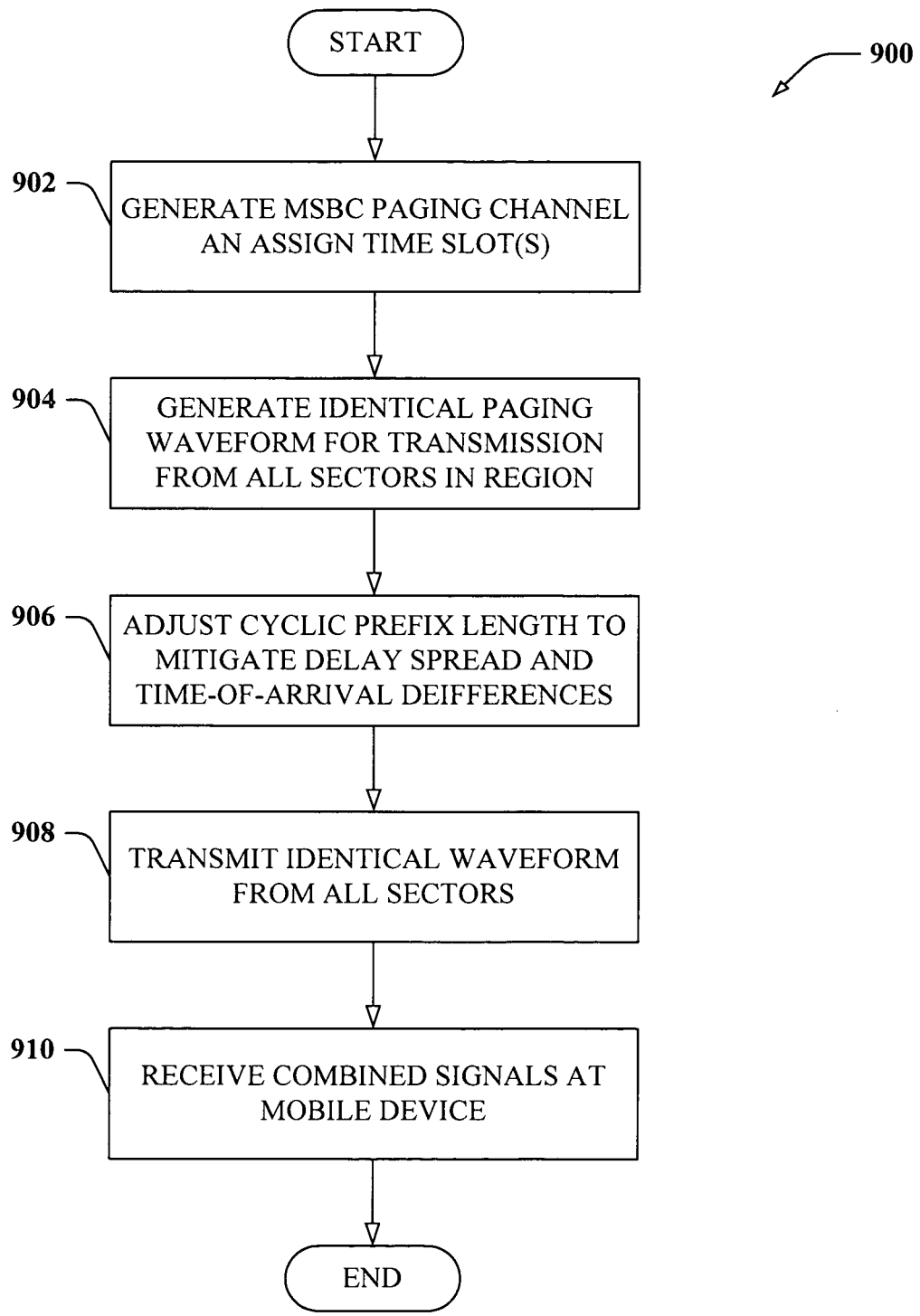
FIG. 9 is an illustration of a methodology for aggregating a page signal at sector edges to improve signal strength and mitigate overhead in a wireless network environment in accordance with various embodiments.

FIG. 9 is an illustration of a methodology 900 for aggregating a page signal at sector edges to improve signal strength and mitigate overhead in a wireless network environment. At 902, pages to be transmitted across a wireless network region can be identified. At 904 transmission resources may be assigned to the pages, e.g. forming an MSBC paging channel. It will be appreciated that resources can be allocated prior to page identification. For example, the MSBC paging channel can be predefined, and resources for message transmission can be pre-assigned for the channel prior to act 902. At 906, identical paging waveforms can be generated at each base station in the region over which the pages are to be transmitted. For example, all pages identified at 902 can be encoded into a single paging message, which can then be modulated using, for instance, an OFDM modulation technique to generate the identical waveform at each base station. At 908, a cyclic prefix can be appended to the message to compensate for delay spread and/or time-of-arrival differences that may arise between waveform transmission and message receipt at a particular receiving area, such as a sector border and the like.

For instance, a first sector can have a radius of 2 miles while a second sector has a radius of one mile (e.g., due to lesser transmission power of a base station therein, . . . ). If both sectors transmit an identical waveform simultaneously, the waveform from the smaller sector will reach a sector border prior to the waveform from the larger sector. Accordingly, by providing a cyclic prefix to the waveform transmitted from the smaller sector, delay spread/or transmission time-of-arrival differences can be mitigated (e.g., waveform transmissions arrive at the perimeter within a pre-defined guard time) to facilitate waveform aggregation in such area prior to transmission receipt by a subscriber station.

The modulated and prefixed waveform can be transmitted simultaneously from all base stations (e.g., sectors) in the region at 910. Because the waveforms are identical, they can be combined over the air where they overlap, and the combined signal can be received at 912. Because the signals transmitted from each sector self-aggregate in the air, the receiving device need not separately receive and demodulate each signal prior to combining signal energy, but rather can simple receive the aggregated waveform and demodulate. In this manner, receiving devices positioned near sector borders can receive a signal of greater strength than permitted by conventional systems and/or methodologies, which do not provide simultaneously transmitted identical waveforms.

Figure 10:
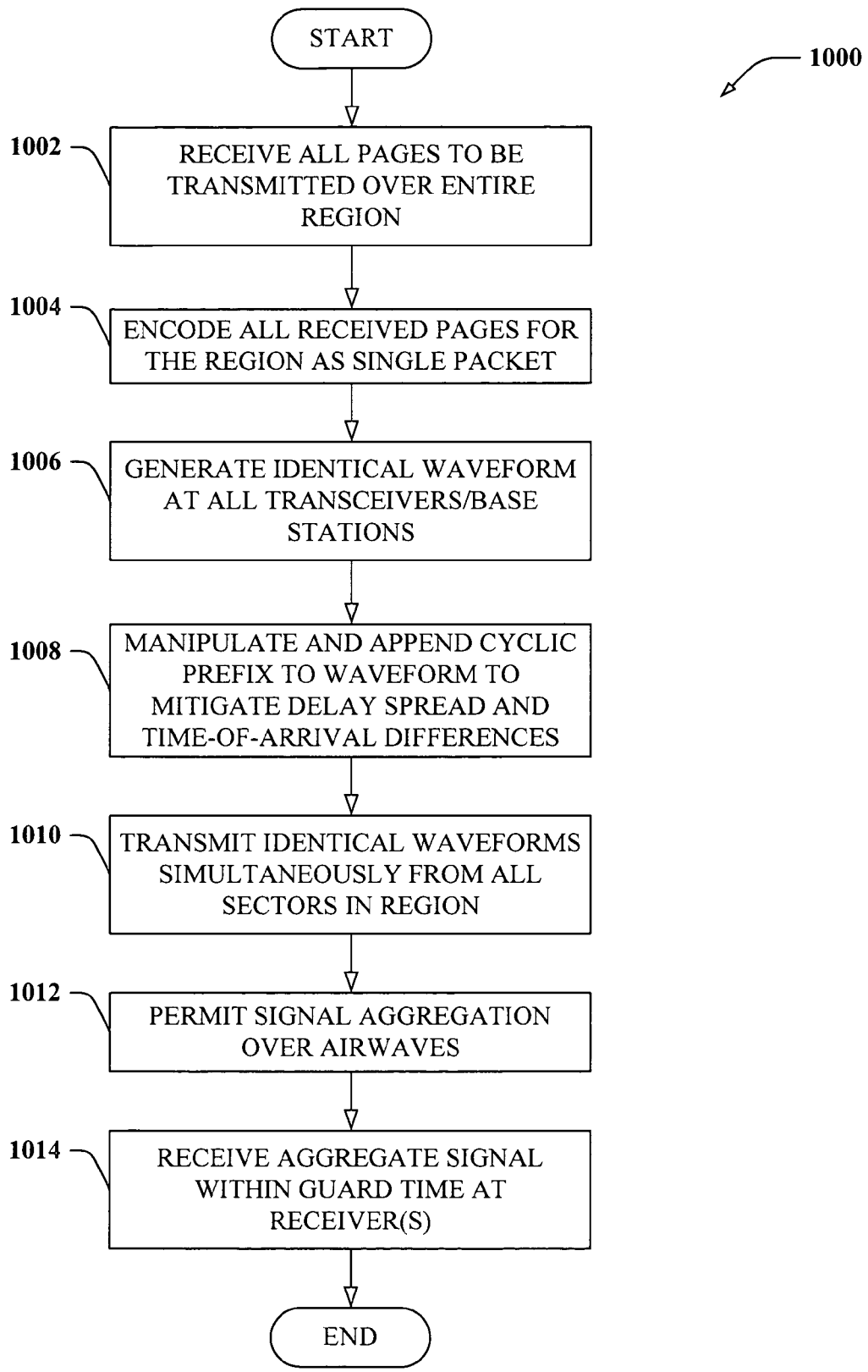
FIG. 10 illustrates a methodology for providing improved signal strength at or near sector perimeters in a wireless network region using an MSBC paging channel in accordance with various embodiments.

FIG. 10 illustrates a methodology 1000 for providing improved signal strength at or near sector perimeters in a wireless network region using an MSBC paging channel. According to the method 1000, incoming pages to be transmitted over an entire region can be identified and/or received at 1002. Identified pages can be encoded as a single data packet at 1004. At 1006, an identical waveform comprising the regional paging data packet can be generated at each sector/base station in the region. In order to account for delay spread, and/or time-of-arrival delays that can occur at sector perimeters, between waveforms transmitted from different sectors, a cyclic prefix can be generated and prepended to one or more waveform instances at 1008. The identical waveforms can be transmitted from each sector simultaneously at 1010 over an MSBC paging channel reserved for such waveforms. The MSBC paging channel can be estimated and/or generated prior to initiation of the methodology 1000. Additionally, resources for transmission can be assigned to the MSBC paging channel such that upon an occurrence of a temporal trigger associated with the resource, all base stations in the region will be prompted to transmit identical paging waveforms. Each base station can additionally be synchronized to every other base station through, for example, a geo-synchronous clock, or the like.

Once the waveforms have been transmitted from the base stations at 1010, over-the-air signal aggregation can occur when waveforms encounter each other in the region at 1012. For instance, identical waveforms can travel at roughly identical speeds, which can facilitate waveform overlap near sector borders within the region. Traditional systems that use sector-specific waveforms cannot permit waveform aggregation in such areas, and thus signal strength is limited to diminished signal energy transmitted from the sector base station. In contrast to such conventional wireless network systems, transmission of identical waveforms at 1010 ensures that such waveforms can self-combine in airspace in which two or more identical signals are simultaneously present, such as airspace over sector borders. Because such identical signals can combine over the air, an aggregate signal can be received by a receiver in, for example, a subscriber station, at 1014, without requiring recognition of the sector from which the signal or portions thereof originated. In this manner, the method 1000 can mitigate a need for a receiver to register with a particular sector, such as is required using traditional network methods. Moreover, because all pages for the region are simultaneously transmitted across the region from all sectors in the region, and because signal aggregation can occur over the air, receiver registration in a particular sector can be made somewhat, if not wholly, unnecessary.

Figure 11:
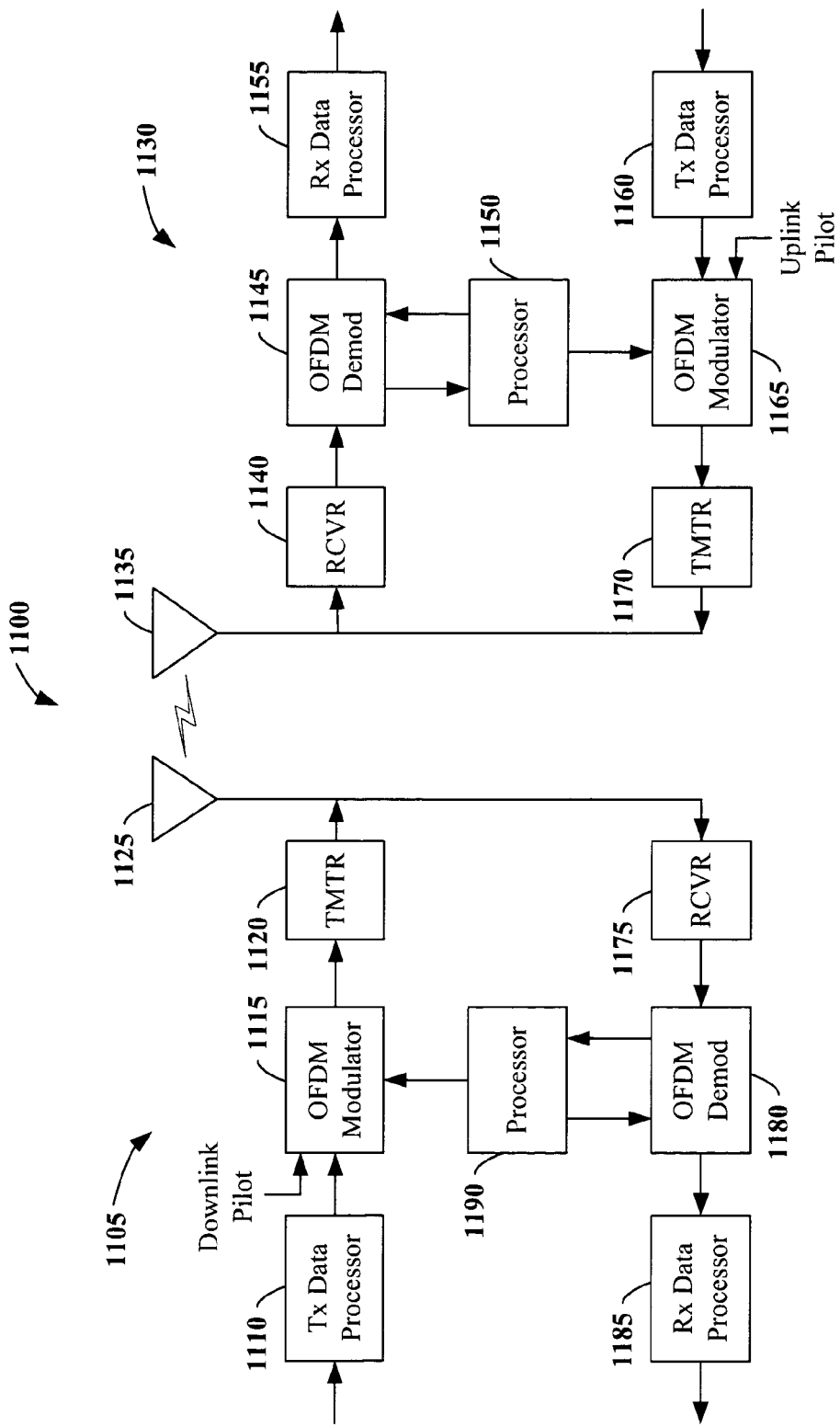
FIG. 11 is an exemplary communication system that can operate in a wireless environment in accordance with various embodiments.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 3-6) and/or methods (FIGS. 7-10) described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). An OFDM modulator 1115 receives and processes the data symbols and pilot symbols and provides a stream of OFDM symbols. An OFDM modulator 1120 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1120 can transform each set of N transmit symbols to the time domain using an N-point IFFT to obtain a "transformed" symbol that contains N time-domain chips. OFDM modulator 1120 typically repeats a portion of each transformed symbol to obtain a corresponding OFDM symbol. The repeated portion is known as a cyclic prefix and is used to combat delay spread in the wireless channel.

A transmitter unit (TMTR) 1120 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. An OFDM demodulator 1145 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1150 for channel estimation. OFDM demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by OFDM demodulator 1145 and RX data processor 1155 is complementary to the processing by OFDM modulator 1115 and TX data processor 1110, respectively, at access point 1100.

On the uplink, a TX data processor 1160 processes traffic data and provides data symbols. An OFDM modulator 1165 receives and multiplexes the data symbols with pilot symbols, performs OFDM modulation, and provides a stream of OFDM symbols. The pilot symbols may be transmitted on subbands that have been assigned to terminal 1130 for pilot transmission, where the number of pilot subbands for the uplink may be the same or different from the number of pilot subbands for the downlink. A transmitter unit 1170 then receives and processes the stream of OFDM symbols to generate an uplink signal, which is transmitted by the antenna 1135 to the access point 1110.

At access point 1110, the uplink signal from terminal 1130 is received by the antenna 1125 and processed by a receiver unit 1175 to obtain samples. An OFDM demodulator 1180 then processes the samples and provides received pilot symbols and data symbol estimates for the uplink. An RX data processor 1185 processes the data symbol estimates to recover the traffic data transmitted by terminal 1135. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1110 and terminal 1135, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing pages to subscriber stations over a wireless network within a transmission region, and near sector boundaries using a multi-sector broadcast channel, comprising:
   receiving data related to a list of all pages to be transmitted to subscriber stations in a paging region that has a plurality of sectors;
   generating a substantially identical waveform at a base station in each of the plurality of sectors;
   transmitting the substantially identical waveform concurrently from a subset of the sectors in the region to permit signal aggregation of waveforms over the air to page subscriber stations identified in the list of pages to be transmitted;
   providing an aggregate waveform to one or more subscriber stations,
   wherein the aggregate waveform comprises combined signal energy from at least two substantially identical waveform transmissions from at least two different sectors to improve spectral efficiency within the transmission region and near sector boundaries; and further comprising providing time slots synchronized across all sectors in the paging region during which individuals sectors in the region simultaneously transmit the substantially identical waveform.

2. The method of claim 1, further comprising defining a paging channel over which the waveform is transmitted and modulating the waveform with an orthogonal frequency division multiplexing technique.

3. The method of claim 1, further comprising dynamically redefining a paging region between time slots by employing a unique identical scrambling code in all sectors included in the region.

4. The method of claim 3, redefining a paging region comprising modifying at least one of a number and identity of sectors comprised by the region.

5. The method of claim 1, further comprising prepending a cyclic prefix to at least one instance of the substantially identical waveform.

6. A method of providing pages to subscriber stations over a wireless network using a multi-sector broadcast channel, comprising:
   receiving data related to a list of all pages to be transmitted to subscriber stations in a paging region that has a plurality of sectors;
   generating a substantially identical waveform at a base station in each of the plurality of sectors;
   prepending a cyclic prefix to at least one instance of the substantially identical waveform;
   determining a guard time within which at least two instances of the substantially identical waveform can arrive at a common boundary of respective sectors from which the at least two instances of the identical waveform are simultaneously transmitted; and
   transmitting the substantially identical waveform concurrently from a subset of the sectors in the region to page subscriber stations identified in the list of pages to be transmitted.

7. The method of claim 6, further comprising designing the cyclic prefix to mitigate time-of-arrival differences of the at least two instances of the substantially identical waveform at the common boundary of respective sectors from which the at least two instances of the substantially identical waveform are simultaneously transmitted to provide the at least two instances of the substantially identical waveform within the guard time for waveform aggregation.

8. A system that facilitates simultaneously transmitting pages to all subscriber stations of a wireless network and improving paging signal spectral efficiency within a transmission region and near sector boundaries, comprising:
   a plurality of transmitters, each of which is located in one of a plurality of sectors of the paging region; and
   a waveform generation component associated with each transmitter, each of the waveform generation components being configured to receive information related to a list of all incoming pages for the paging region and to generate a waveform comprising all pages for the region;

wherein the waveform generation components generate substantially identical waveforms and each of the transmitters concurrently transmits the substantially identical waveforms to permit signal aggregation of wave forms over the air;

wherein each waveform generation component comprises an orthogonal frequency division multiplexing component that modulates one of the substantially identical waveforms; and further comprising a synchronization component that defines time slots during which the plurality of transmitters simultaneously transmit the substantially identical waveforms from each sector in the region.

9. The system of claim 8, the network dynamically remaps the paging region based at least in part on a number of pages to be transmitted in the waveform, wherein sectors to be included in the paging region employ a unique scrambling code when generating the substantially identical waveforms.

10. The system of claim 9, wherein sectors not included in the paging region employ one or more scrambling codes that are at least one of orthogonal and pseudo-orthogonal to the unique scrambling code employed by sectors included in the paging region.

11. The system of claim 8, further comprising an encoder that encodes all pages for the region as a single paging data packet.

12. The system of claim 11, each waveform generator generates an identical waveform comprising the encoded paging data packet.

13. The system of claim 12, wherein each waveform generation component comprises an orthogonal frequency division multiplexing component that modulates one of the substantially identical waveforms comprising the encoded paging data packet.

14. An apparatus that facilitates providing improved paging signal spectral efficiency in a multi-sector broadcast channel for transmission of pages in a wireless network region, comprising:
    a controller that receives a list of pages to be transmitted to access terminals in the wireless network region and generates and transmits an instruction related to the list of pages; and
    a waveform generation component that receives the instruction and generates a waveform comprising all pages to be transmitted to access terminals in the region, wherein the waveform is substantially identical to a second waveform transmitted to the access terminals, the waveform being sufficiently identical to the second waveform to aggregate and to combine signal energy with the second waveform after transmission over the air near sector perimeters.

15. The system of claim 14, further comprising a plurality of base stations, each base station in the region comprises a respective waveform generation component that receives the instruction from the base station controller, and each waveform generation component generates a substantially identical waveform comprising all pages to be transmitted, in response to the instruction.

16. The system of claim 15, each base station further comprises a synchronizer component that synchronizes transmission of the substantially identical waveform from the respective base station, such that the substantially identical waveforms are concurrently transmitted across the region.

17. The system of claim 14, the waveform comprises paging information without sector identity information.

18. The system of claim 14, the base station controller is housed in one of a plurality of base stations in the region.

19. An apparatus that facilitates providing improved paging spectral efficiency within a transmission region and near sector boundaries in paging all intended subscriber stations in a wireless network region using simultaneous multi-sector broadcast transmissions, comprising:
    means for receiving a complete list of pages to be transmitted to subscriber stations in a region;
    means for transmitting an instruction to a plurality of base stations in respective sectors in the region;
    means for generating an identical waveform based on the instruction at each of the plurality of transmission base stations, the identical waveform comprising all pages to be transmitted in the region; and
    means for transmitting the identical waveform simultaneously from all base stations in the region, signal energy of at least two identical waveforms aggregated over the air and near sector perimeters.

20. The apparatus of claim 19, further comprising means for modulating identical waveforms prior to transmission.

21. The apparatus of claim 20, the means for modulating comprises means for employing an orthogonal frequency division multiplexing technique.

22. The apparatus of claim 19, further comprising means for assigning time slots for simultaneous transmission of identical waveforms from all sectors in the region over a multi-sector broadcast channel.

23. The apparatus of claim 19, further comprising means for dynamically reassigning sectors to the region between transmission timeslots.

24. A computer-readable medium having stored thereon computer-executable instructions in a non-transitory storage medium for improving paging signal spectral efficiency to subscriber stations, comprising:
    receiving a list of devices to be paged in a region of a wireless network;
    generating a waveform comprising paging signals for each device identified in the list;
    transmitting the waveform simultaneously over a multi-sector broadcast channel with at least one other identical waveform to permit signal aggregation of waveforms over the air; and
    further comprising providing time slots synchronized across all sectors in the paging region during which individuals sectors in the region simultaneously transmit the substantially identical waveform.

25. The computer-readable medium of claim 24, further comprising computer executable instructions for performing orthogonal frequency division multiplexing modulation on identical waveforms.

26. The computer-readable medium of claim 24, further comprising computer executable instructions for assigning transmission time slots to the multi-sector broadcast channel to transmit identical waveforms simultaneously.

27. The computer-readable medium of claim 24, employed in a base station in each of a plurality of sectors in the region, each base station transmits an identical waveform that aggregates with other identical waveforms over the air.

28. The computer-readable medium of claim 24, further comprising computer executable instructions for prepending a cyclic prefix to at least one instance of the identical waveform to mitigate time-of-arrival differences at a common sector border for identical waveforms transmitted from adjacent sectors and aggregating signal strength at the sector border.

* * * * *